United States Patent
Yerokhin et al.

(10) Patent No.: US 11,453,052 B2
(45) Date of Patent: Sep. 27, 2022

(54) DEGATE ROBOT END-OF-ARM TOOL AND METHODS OF USE

(71) Applicant: Honda Motor Co., Ltd., Tokyo (JP)

(72) Inventors: Zakhar Yerokhin, Alliston (CA); Jason Elmer Charles Overland, Mono (CA); You Dong, Toronto (CA)

(73) Assignee: HONDA MOTOR CO., LTD., Tokyo (JP)

( * ) Notice: Subject to any disclaimer, the term of this patent is extended or adjusted under 35 U.S.C. 154(b) by 218 days.

(21) Appl. No.: 16/814,633

(22) Filed: Mar. 10, 2020

(65) Prior Publication Data

US 2021/0283682 A1    Sep. 16, 2021

(51) Int. Cl.
| | |
|---|---|
| *B22D 31/00* | (2006.01) |
| *B22D 17/20* | (2006.01) |
| *B25J 15/00* | (2006.01) |
| *B25J 11/00* | (2006.01) |

(52) U.S. Cl.
CPC ......... *B22D 31/00* (2013.01); *B22D 17/2076* (2013.01); *B25J 11/0055* (2013.01); *B25J 15/0019* (2013.01); *B25J 15/0038* (2013.01)

(58) Field of Classification Search
CPC .... B22D 17/20; B22D 17/2076; B22D 29/04; B22D 31/00; B25J 11/00; B25J 15/00; B25J 15/0019; B25J 15/0038
USPC .............. 164/262, 264, 265, 70.1, 404, 412; 83/109
See application file for complete search history.

(56) References Cited

U.S. PATENT DOCUMENTS

| | | | | |
|---|---|---|---|---|
| 5,201,812 A | * | 4/1993 | Goss | B22D 29/00 164/404 |
| 6,209,431 B1 | | 4/2001 | Wickham | |
| 2002/0174968 A1 | * | 11/2002 | Mertins | B22C 7/02 164/35 |
| 2019/0358827 A1 | * | 11/2019 | Guo et al. | B25J 15/0293 |
| 2019/0366556 A1 | * | 12/2019 | Wang et al. | B25J 15/0293 |

FOREIGN PATENT DOCUMENTS

| | | |
|---|---|---|
| CN | 106553299 A | 4/2017 |
| CN | 108637208 A | 10/2018 |
| CN | 208583965 U | 3/2019 |
| KR | 920005550 B1 | 7/1992 |

\* cited by examiner

*Primary Examiner* — Kevin P Kerns
(74) *Attorney, Agent, or Firm* — Armstrong Teasdale LLP (57) ABSTRACT

A method and an automatic degate system includes a fixture configured to receive a workpiece, a registration device configured to position the workpiece in a predetermined orientation and position, and a robotic arm. The robotic arm is configured to move in at least a gripping direction. The robotic arm includes a gripping device configured to engage the workpiece at predetermined locations after being moved in the gripping direction. The robotic arm also includes a support bracket, a plurality of elongate rods each having a predetermined length and extending orthogonally from the support bracket, and a respective cutting puck coupled to a distal end of each of the plurality of elongate rods. The cutting pucks configured to remove a biscuit of excess material from the workpiece while being moved in the gripping direction.

15 Claims, 9 Drawing Sheets

DEGATE ROBOT END-OF-ARM TOOL AND METHODS OF USE

BACKGROUND

This description relates to assembly line tooling and more particularly, to an end-of-arm tool (EOAT) operated on a robotic arm.

At least some components of manufacturing processes are formed by casting molten metal. The casting process often leaves excess solidified metal attached to the cast component, which must be removed before further processing can occur. The excess metal may be removed automatically via a degating machine. At least some known degating machines include a robotic arm that guides a punch assembly into various positions relative to the cast component to remove the excess metal. The excess metal, when removed, falls into a waste recovery system. Known degating machines may be inefficient in requiring an excessive number of degating steps along with periodic manual interventions to correct errors in the process, both of which are time consuming and labor intensive. For example, at least some known degating machines attempt to punch out excess metal using an upward stroke to dislodge the excess metal. However, gravity may cause the removed metal to fall back onto or into the component from which it was removed or onto the machine that removed the excess metal. The surplus material may cause jams or require manual intervention to separate the excess metal from the component.

BRIEF DESCRIPTION

In one aspect, an automatic degate machine includes a fixture configured to receive a workpiece, a registration device configured to position the workpiece in a predetermined orientation and position, and a robotic arm. The robotic arm includes a punch assembly and a workpiece gripping device. The punch assembly includes a support bracket and a plurality of elongate rods extending orthogonally from the support bracket. Each of the plurality of elongate rods has a predetermined length. The punch assembly also includes a respective puck coupled to a distal end of each of the plurality of elongate rods. The robotic arm further includes a gripping device.

In another aspect, a method of automatically degating a workpiece includes receiving the workpiece at a fixture, registering features of the workpiece in relation to the fixture, and driving a punch assembly towards at least some of the registered features wherein the punch assembly includes a plurality of cutting pucks. The method also includes punching out a plurality of biscuits of excess workpiece material attached to the workpiece using the plurality of cutting pucks, gripping the workpiece with a gripping device at certain registered features corresponding to complementary features of the gripping device, and transferring the workpiece to a downstream assembly station of an assembly line.

In yet another aspect, an automatic degating system includes a fixture configured to receive a raw casting from an upstream assembly line station. The raw casting includes a plurality of biscuits of excess metal. The automatic degating system also includes a robotic arm having a punch assembly coupled to a distal end of the robotic arm and a gripping device co-mounted with the punch assembly at the distal end of the robotic arm. The gripping device is configured to engage lifting features on the raw casting after the plurality of biscuits of excess metal have been removed.

Various refinements exist of the features noted above in relation to the various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. Again, the summary presented above is intended only to familiarize the reader with certain aspects and contexts of the present disclosure without limitation to the claimed subject matter.

BRIEF DESCRIPTION OF THE DRAWINGS

FIGS. 1-9 show exemplary embodiments of the method and system described herein.

Although specific features of various embodiments may be shown in some drawings and not in others, this is for convenience only. Any feature of any drawing may be referenced and/or claimed in combination with any feature of any other drawing.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

Embodiments of systems and methods of degating a casting are described herein. The casting may be formed by injecting and/or pouring molten metal into a die (a mold) to form the casting or by another similar method. A robotic arm is a programmable, automated device that is adapted to unload a casting assembly that includes the casting, runners, and the sprue, from a die casting machine and set the casting assembly down in an organized, predictable fashion on a fixture. Degating is a process for removing the waste portions, such as, the gate, the runners, and the sprue from the casting. A degating machine is a machine that uses a complex punch set to separate the "good casting" from the waste portions. The good casting is the desired product resulting after degating. The waste portions include a gate remnant, also referred to as a biscuit, which is the portion of the gate that is separated from the casting during the degating process.

The following description refers to the accompanying drawings, in which, in the absence of a contrary representation, the same numbers in different drawings represent similar elements.

Figure 1:
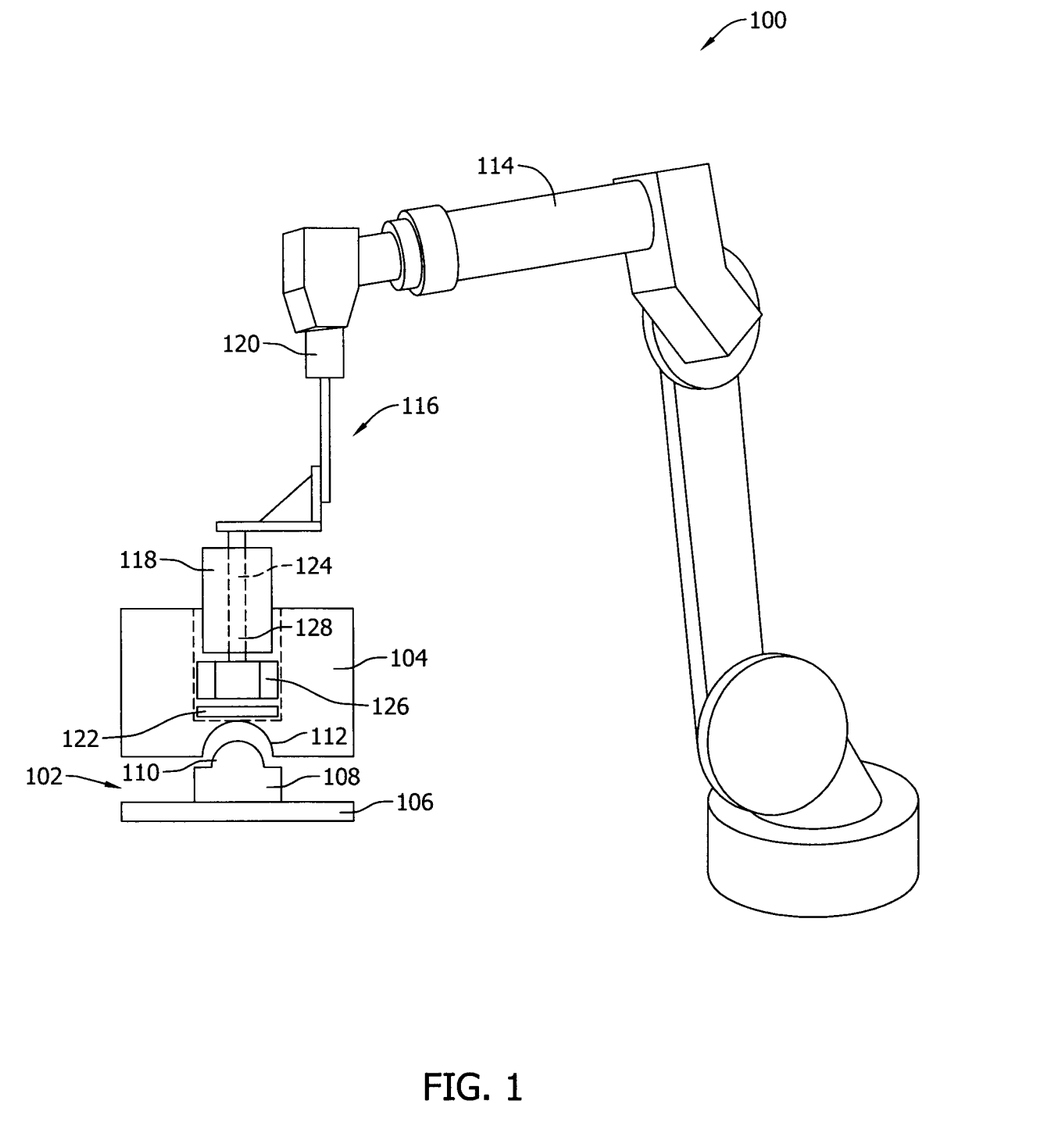
FIG. 1 is a side elevational view of an automatic degate machine in accordance with one aspect of the present disclosure.

FIG. 1 is a side elevational view of an automatic degate machine 100. In the exemplary embodiment, automatic degate machine 100 includes a fixture 102 oriented to receive a workpiece 104, such as, an engine block for a vehicle. Fixture 102 includes a base 106 supporting a workpiece registration key 108. Workpiece registration key 108 includes a first feature 110 that is complementary to a second feature 112 located on workpiece 104. First feature 110 and second feature 112 are configured to mate such that dimensions and components of workpiece 104 are maintained in a predetermined orientation and position. In the exemplary embodiment, automatic degate machine 100 further includes a robotic arm 114 that includes a punch assembly 116 and a gripping device 118. In various embodiments, punch assembly 116 and gripping device 118 are co-mounted end-of-arm tooling coupled to a distal end 120 of robotic arm 114. Punch assembly 116 includes a plurality of downward extending rods 124 having a cutting puck 126 coupled to a distal end 128 of each rod 124.

During operation, workpiece 104 is positioned on fixture 102 to enable several biscuits 122 of excess metal that may still be left attached to workpiece 104 to be removed. Robotic arm 114 directs punch assembly 116 and gripping device 118 towards workpiece 104. Punch assembly 116 operates on the same movement where gripping device 118 is enroute to pick up workpiece 104. Prior to gripping device 118 becoming aligned with lifting features on workpiece 104, punch assembly 116 impacts the biscuits 122 of excess metal and removes the biscuits 122 from workpiece 104. Gripping device 118 then aligns with the lifting features, engages the lifting features, and lifts workpiece 104 to a next station for further processing.

Figure 2:
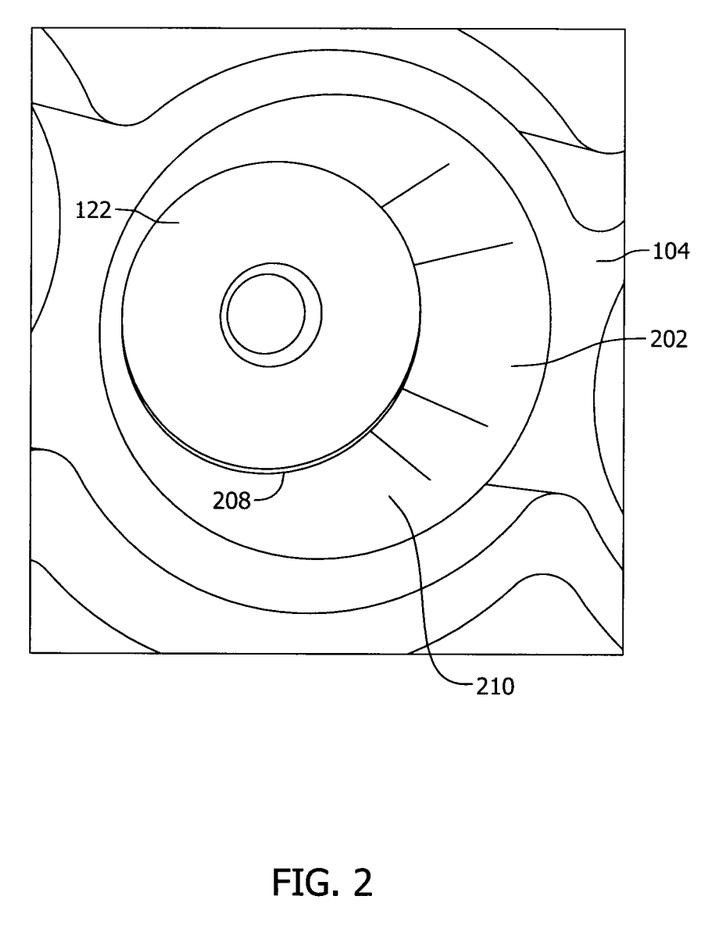
FIG. 2 is a perspective view looking down a bore of a cylinder of a workpiece shown in FIG. 1.

FIG. 2 is a perspective view of a cylinder bore 202 of workpiece 104. In the exemplary embodiment, workpiece 104 is an engine block for a vehicle (only a portion of an engine is shown in FIG. 2). The engine block includes a plurality of cylinder bores 202. During the casting process of forming workpiece 104, some of the casting material, such as, but not limited to, aluminum, is left external to the desired mold volume where it may undesirably gather to obstruct or plug orifices, roughen surfaces, and the like. In the present aspect, the excess casting material forms biscuit 122 at a bottom 208 of cylinder bores 202 of the vehicle engine. Cylinder bore 202 forms an opening extending through the engine block, which may be lined with a liner 210. In various embodiments, liner 210 is fabricated from a heat tolerant metal or a ceramic material.

Figure 3:
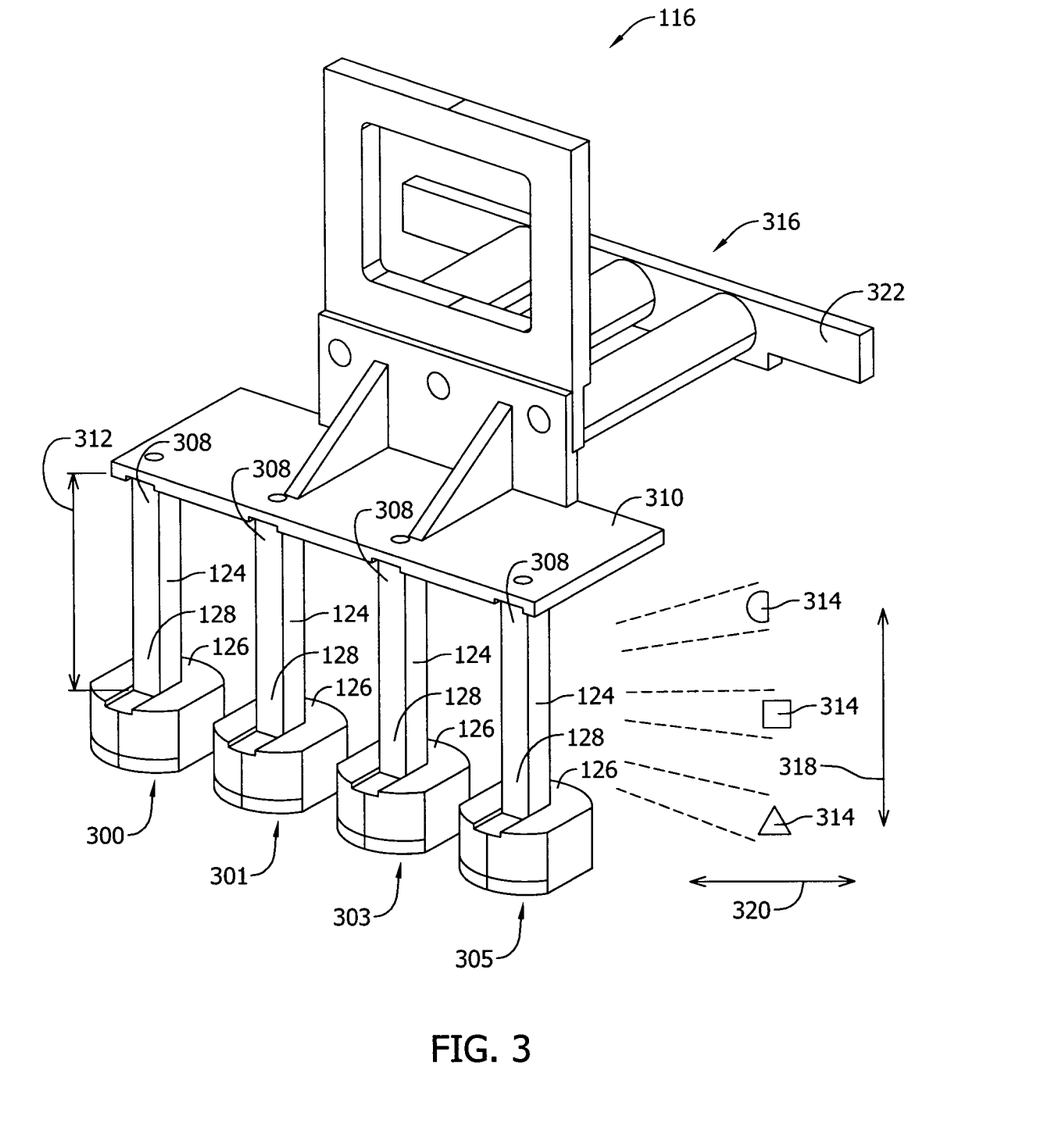
FIG. 3 is a perspective view of a punch assembly shown in FIG. 1.

FIG. 3 is a perspective view of punch assembly 116. In the exemplary embodiment, punch assembly 116 includes a plurality of cutting puck assemblies 300, 301, 303, and 305. Each cutting puck assembly 300, 301, 303, and 305 includes cutting puck 126 coupled to a distal end 128 of a respective standoff rod 124. An opposing connection end 308 of each standoff rod 124 is coupled to a support bracket 310, which may be formed of a plate. Alternatively, bracket 310 may have any other shape that enables punch assembly 116 to function as described herein, including but not limited to, a pipe, a channel, a rod, a beam, and the like. Each standoff rod 124 has a length 312 and a cross-sectional shape 314. Length 312 of respective cutting puck assemblies 300, 301, 303, and 305 may be equal or may be different. In the exemplary embodiment, standoff rods 124 of certain pairs of cutting puck assemblies 300, 301, 303, and 305 are of equal length 312, where other pairs of standoff rods 124 of other pairs of cutting puck assemblies 300, 301, 303, and 305 have different lengths 312. For example, if standoff rods 124 of 300 and 305 are paired, they have the same length 312. Likewise, if standoff rods 124 of cutting puck assemblies 301 and 303 are paired, their lengths 312 are also equal, but the length 312 of standoff rods 124 of cutting puck assembly pair 300 and 305 is different than the length 312 of standoff rods 124 of cutting puck assembly pair 301 and 303. Other differences are explained in more detail below.

Punch assembly 116 also includes an offset support assembly 316 that extends away from support bracket 310. More specifically, offset support assembly 316 extends approximately orthogonally relative to the orientation of standoff rods 124. For example, in the exemplary embodiment, standoff rods 124 extend in a substantially vertical direction 318 and offset support assembly 316 extends from support bracket 310 in a generally horizontal direction 320. A connection bracket 322 permits connection of offset support assembly 316 to robotic arm 114.

Figure 4:
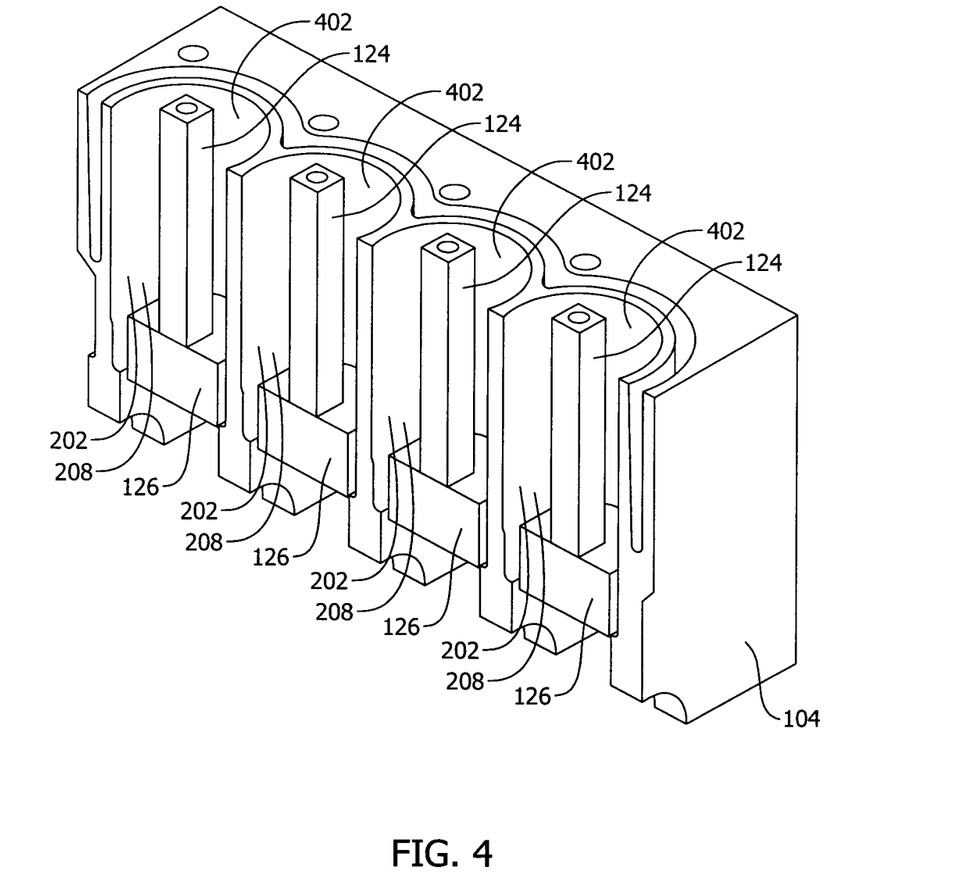
FIG. 4 is a cutaway view of the workpiece shown in FIG. 1 and including cutting pucks fully inserted into respective cylinder bores.

FIG. 4 is a cutaway view of workpiece 104 with cutting pucks 126 fully inserted into respective cylinder bores 202. In the exemplary embodiment, workpiece 104 is a vehicle engine including four cylinder bores 202 in-line. Cutting pucks 126 are aligned to all be substantially centered in cylinder bores 202 when fully inserted and during travel from a cylinder mouth 402 downwardly to bottom 208. Proper alignment of cutting pucks 126 in cylinder bores 202 facilitates preventing marring of liner 210.

Figure 5:
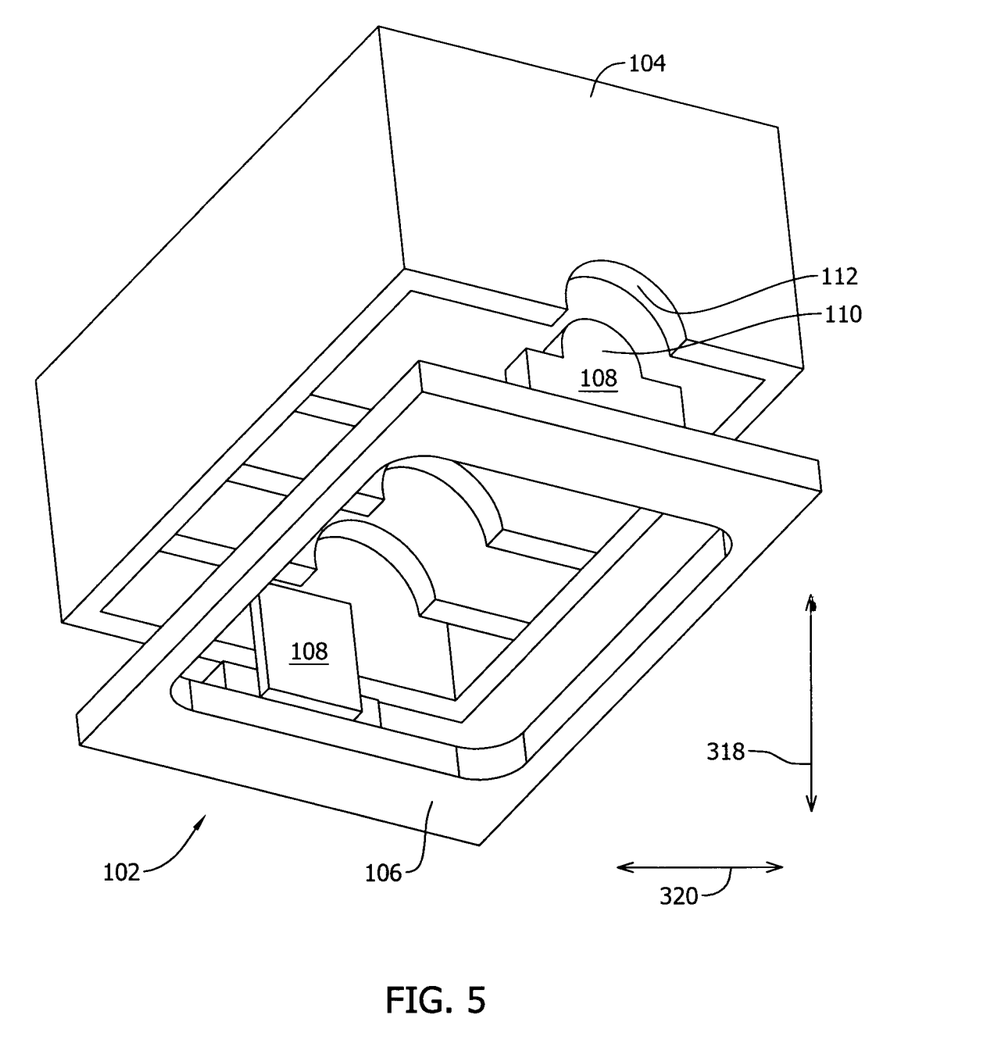
FIG. 5 is a perspective view of the workpiece shown in FIG. 1 mated to a registration device shown in FIG. 1.

FIG. 5 is a perspective view of workpiece 104 mated to fixture 102. Fixture 102 is oriented to position workpiece 104 in a predetermined orientation and position. In the exemplary embodiment, fixture 102 includes a base 106 and a plurality of registration keys 108 that extend upwardly in a generally vertical direction 318. At least some of the plurality of registration keys 108 include first registration feature 110 that mates with second complementary feature 112 formed on workpiece 104. For example, in the exemplary embodiment, registration feature 110 is a tab that mates with a complementary feature 112 in a bearing housing. With a fixed position of registration key 108 being known and with an electronic model of workpiece 104 stored in a memory of a controller associated with robotic arm 114, positioning workpiece 104 onto registration keys 108 enables all features of workpiece 104 to be accurately determined. Robotic arm 114 then is able to direct cutting pucks 126 downwardly into cylinder bores 202 to punch out biscuits 122. Moreover, arm 114 is also able to guide gripping device 118 to lifting features defined on workpiece 104.

Figure 6:
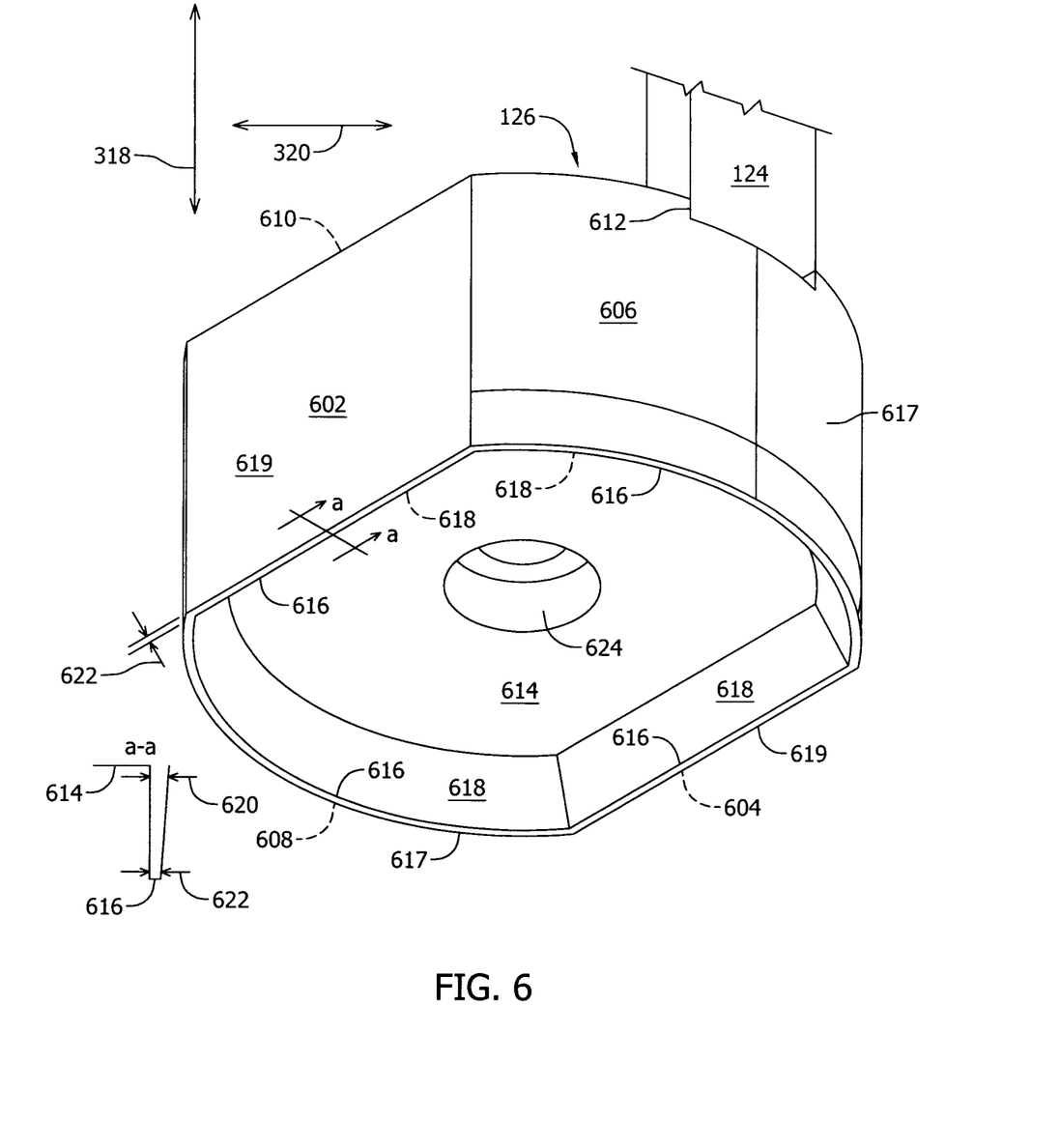
FIG. 6 is a perspective view of a cutting puck that may be used with the automatic degate machine shown in FIG. 1.

FIG. 6 is a perspective view of an exemplary cutting puck 126 that may be used with degate machine 100 (shown in FIG. 1). In the exemplary embodiment, cutting puck 126 has a truncated circular cross-sectional body that includes a pair of opposing straight sidewalls 602 and 604, and two opposing arcuate sidewalls 606 and 608. An upper surface 610 includes a notch 612 that is shaped complementarily to a respective standoff rod 124. Each standoff rod 124 or group of standoff rods may have a different cross-sectional shape to prevent incorrect pairing of standoff rods 124 and cutting pucks 126. Additionally, each standoff rod 124 or group of standoff rods may have a different keyway or other mechanical fit feature or shape to prevent incorrect pairing of standoff rods 124 and cutting pucks 126. Further, each standoff rod 124 or group of standoff rods may have a different color or other visual cue to prevent incorrect pairing of standoff rods 124 and cutting pucks 126. A design of cutting pucks 126 may facilitate "Murphy-proofing" the installation of cutting pucks 126 in that cutting pucks 126 may be installed in only one or in a limited number of configurations or orientations.

Each cutting puck 126 includes a lower surface 614 that is recessed with respect to sidewalls 602, 604, 606, and 608. Recessed lower surface 614 provides a cutting edge 616 along a periphery of a lower portion 618 of sidewalls 602, 604, 606, and 608. Cutting edge 616 extends below recessed surface 614. In the exemplary embodiment, each cutting puck 126 has an irregular circular cross-sectional profile defining a plurality of arcuate segments 617 and a plurality of straight segments 619. In various embodiments, cutting edge 616 of at least one respective cutting puck 126 is beveled or tapered. Lower portion 618 includes sidewalls 602, 604, 606, and 608 that taper from a first thickness 620 to a second thickness 622 of lower portion 618 along edge 616. Lower surface 614 also includes a central counter bore 624 to accommodate a head of a bolt that connects puck 126 to respective standoff rod 124.

Figure 7:
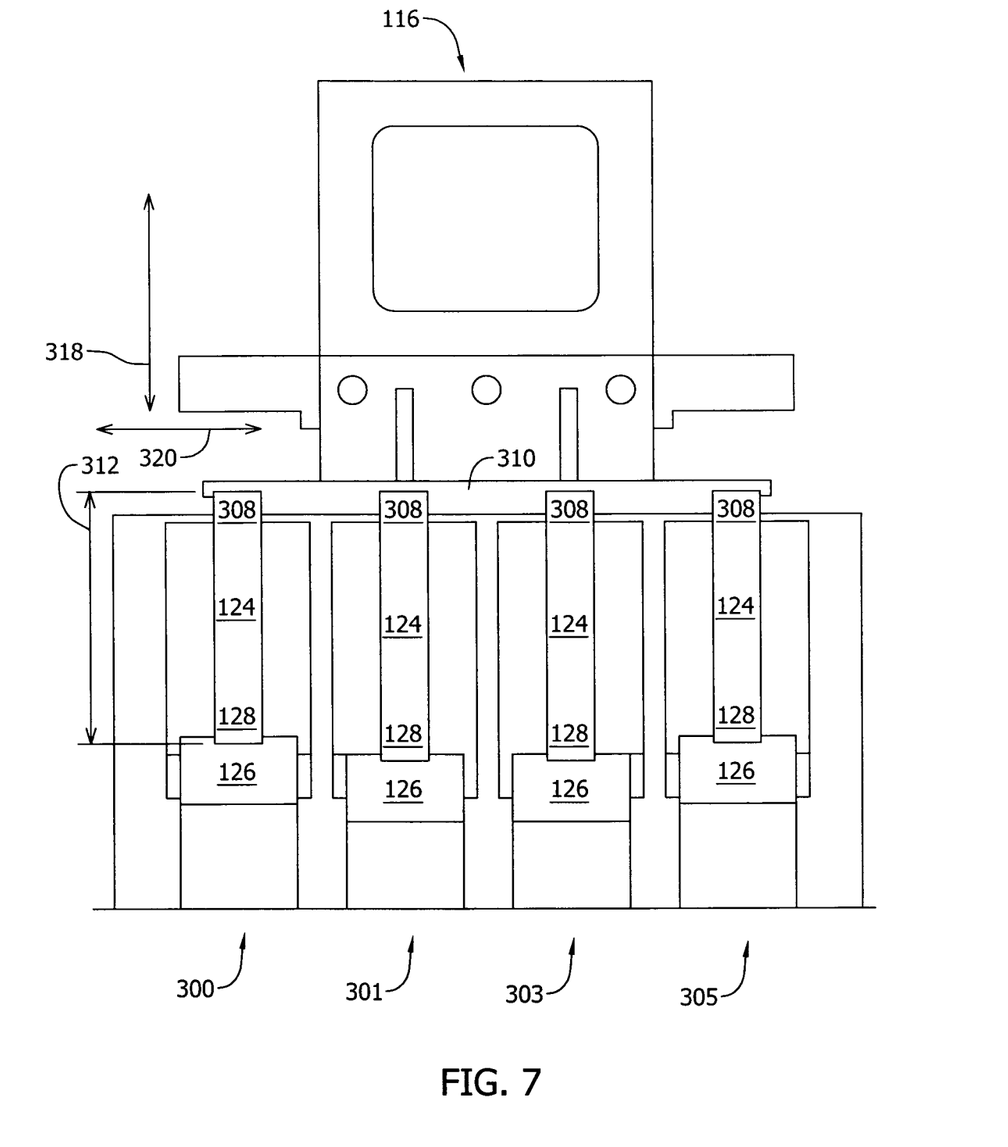
FIG. 7 is a front elevational view of a punch assembly shown in FIG. 1.

FIG. 7 is a front elevational view of punch assembly 116. Punch assembly 116 includes standoff rods 124 coupled to support bracket 310 by connection end 308. Cutting pucks 126 are each coupled to each distal end 128. A length 312 of standoff rods 124 may vary depending on a position of each standoff rod 124 relative to support bracket 310. For example, in FIG. 7, standoff rods 124 of cutting puck assemblies 300 and 305 are shorter than standoff rods 124 of cutting puck assemblies 301 and 303. Such a difference in length permits cutting pucks 126 of cutting puck assemblies 301 and 303 to engage biscuits 122 in their respective cylinder bores 202 before cutting pucks 126 of cutting puck assemblies 300 and 305 are able to engage biscuits 122 in their respective cylinder bores 202. Consequently, punch assembly 116 and robotic arm 114 do not punch out four biscuits 122 simultaneously, but rather the force generated by impacting the biscuits 122 can be spread temporally by staggering the impacts of cutting pucks 126 with biscuits 122, thereby reducing the load on punch assembly 116 and robotic arm 114. As a result, a robotic arm 114 having a lower payload may be selected, which reduces the cost of the initial installation of the automatic degate machine 100 as well as the energy used to power the automatic degate machine 100. Furthermore, failure and/or wear on punch assembly 116 and robotic arm 114 may be reduced, along with corresponding maintenance costs, by reducing the load on punch assembly 116 and robotic arm 114.

Figure 8:
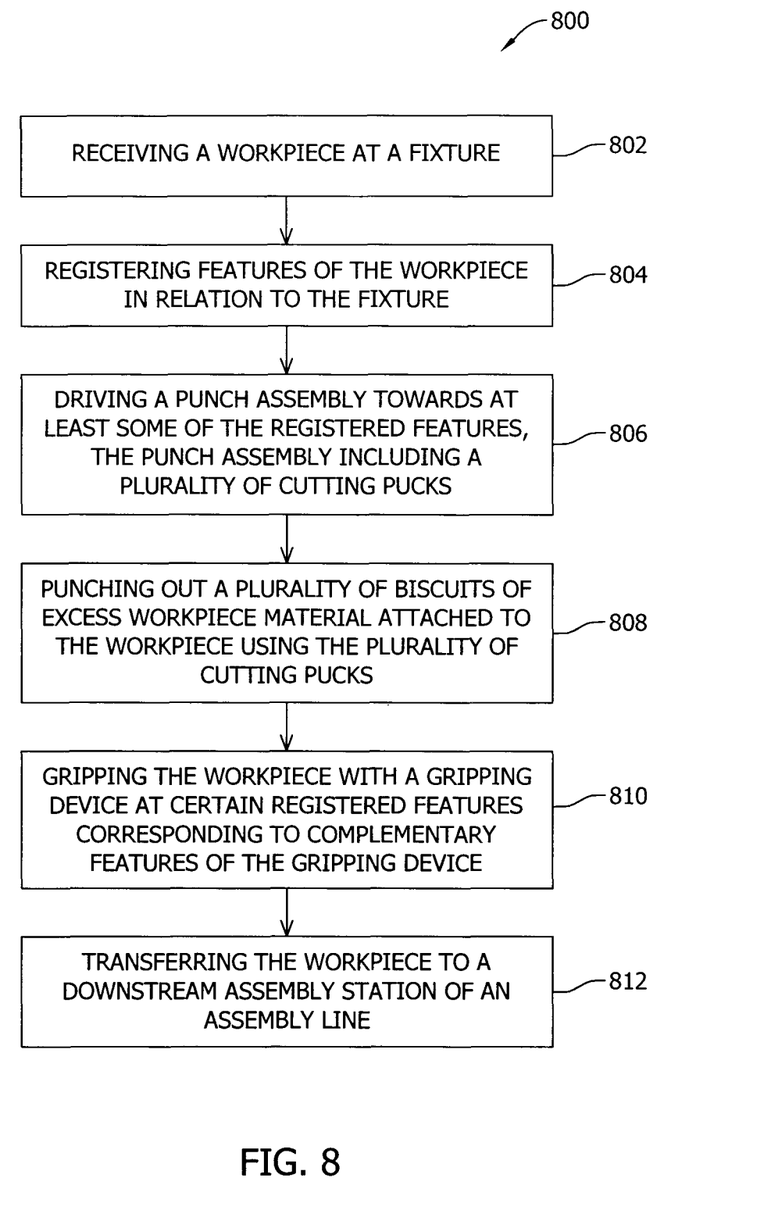
FIG. 8 is a flowchart of an exemplary method of automatically degating a workpiece.

FIG. 8 is a flowchart of an exemplary method 800 of automatically degating a workpiece. In the exemplary embodiment, method 800 includes receiving 802 the workpiece at a fixture, registering 804 features of the workpiece in relation to the fixture, and driving 806 a punch assembly towards at least some of the registered features wherein the punch assembly includes a plurality of cutting pucks. Method 800 also includes punching 808 out a plurality of biscuits of excess workpiece material attached to the workpiece using the plurality of cutting pucks, gripping 810 the workpiece with a gripping device at certain registered features that correspond to complementary features of the gripping device. The workpiece is then transferred to a downstream assembly station of an assembly line.

In various embodiments, the workpiece is received 802 from an upstream process of an assembly line, such as, a casting process. The workpiece may be handled by a first robotic arm that moves the workpiece from the casing process to a fixture used in the degating process. Alternatively, or in addition, a second robotic arm used in the degating process may be used to move the workpiece from the upstream process to the fixture. In other embodiments, a different mechanism for moving the workpiece to the fixture may be used.

Receiving 802 the workpiece in the fixture enables features of the workpiece to be registered with respect to the fixture. In one embodiment, a model or other electronic information of the workpiece is stored in a memory of a controller associated with the second robotic arm. After the workpiece is properly seated in the fixture, the location of all features of the workpiece may be determined. For example, in the exemplary embodiment, the workpiece is embodied in an automobile engine block. When seated in the fixture, the location of features of the engine block that mate with the fixture are known and using the model, all other features of the engine block are easily determinable. Accordingly, a position and orientation of the cylinders of the engine block may be accurately determined.

A punch assembly may be directed to particular features of the engine block, namely, the cylinders, to initiate degating the workpiece using the determined location and orientation. The punch assembly includes a plurality of cutting pucks that are driven 806 into the cylinders from an upper end of the cylinder bore down to a bottom of the cylinder bore where biscuits of excess casting material form. The downward movement of the cutting pucks cuts or punches 808 out the biscuits upon impact and the biscuits become free to fall into a collecting bin below the engine block. In various embodiments, the cutting pucks are configured to impact the biscuits at different times to reduce a shock to the punch assembly and second robotic arm. The timing of the impact is determined by a length of the standoff rods coupling the cutting pucks to the punch assembly. The longer standoff rods impact the biscuits first and each shorter standoff rod impacts the respective biscuit at a later time. In the example embodiment, the standoff rods are paired to reduce twisting of the support bracket.

After the biscuits have been dislodged and fallen away from the engine block, the second robotic arm continues on its same trajectory until a gripping device co-mounted on the second robotic arm with the punch assembly is aligned with lifting features of the engine block. The gripping device then grabs the engine block, lifts it from the fixture, and transfers 812 the engine block to a downstream assembly station of an assembly line.

Figure 9:
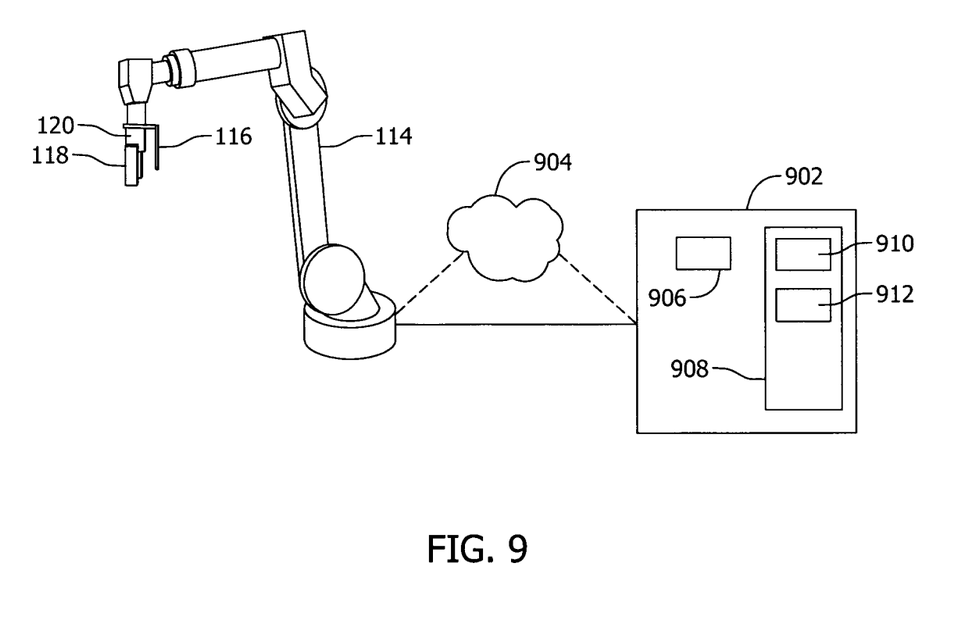
FIG. 9 is a schematic diagram of the automatic degate machine shown in FIG. 1.

FIG. 9 is a schematic diagram of automatic degate machine 100 (shown in FIG. 1). Automatic degate machine 100 includes a robotic arm 114 that supports and controls the operation of gripping device 118 and punch assembly 116. A controller is communicatively coupled to robotic arm 114 directly or through a network 904. Controller 902 includes a processor 906 communicatively coupled to a memory device 908, which stores program instructions 910 executable by processor 906 and data 912 accessible to processor 906 as needed.

The above-described embodiments of a method and system of degating a workpiece provides a cost-effective and reliable method for automatically handling the workpiece and incorporating the movement needed in the degating process with the movement needed to pick-up the workpiece to transfer it to a downstream process. This method facilitates reducing manual intervention in the degating process. More specifically, the methods and systems described herein facilitate punching out biscuits formed during the upstream casting process and providing an efficient path to remove biscuits from the degating process. In addition, the above-described methods and systems facilitate reducing shock and strain on the punch assembly by sequentially punching out the biscuits rather than punching out all biscuits simultaneously. As a result, the methods and systems described herein facilitate improving cycle time through the degating process and reducing manual intervention in the degating process in a cost-effective and reliable manner.

This written description uses examples to describe the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An automatic degate machine comprising:
    a robotic arm configured to move in at least a gripping direction, the robotic arm comprising:
        a gripping device configured to engage a workpiece at lifting features, wherein the workpiece includes a plurality of cylinder bores; and
        a punch assembly comprising:
            a support bracket;
            a plurality of elongate rods extending orthogonally from said support bracket, each of said plurality of elongate rods comprising a predetermined length; and
            a respective cutting puck coupled to a distal end of each of said plurality of elongate rods, the respective cutting puck sized and shaped to be inserted into a respective cylinder bore of the plurality of cylinder bores and configured to remove a biscuit of excess material from the workpiece while being moved in the gripping direction.

2. The automatic degate machine of claim 1, wherein a length of at least one of the plurality of elongate rods is not equal to the length of another of the plurality of elongate rods.

3. The automatic degate machine of claim 1, wherein the workpiece is a raw casting, each of said respective pucks configured to engage a respective biscuit of excess metal and punch it away from the workpiece.

4. The automatic degate machine of claim 1, wherein the length of the plurality of elongate rods are sized to prevent all of the respective pucks from impacting a biscuit of excess metal simultaneously, the biscuit of excess metal attached to the workpiece.

5. The automatic degate machine of claim 1, wherein at least one of the plurality of elongate rods includes an asymmetric cross-section.

6. The automatic degate machine of claim 1, wherein at least one respective puck includes an irregular circular cross-section.

7. The automatic degate machine of claim 6, wherein the irregular circular cross-section includes opposing truncated edges.

8. The automatic degate machine of claim 6, wherein the irregular circular cross-section includes two opposing circular arcs separated by two opposing substantially straight edges.

9. The automatic degate machine of claim 1, wherein said robotic arm further comprises a gripping device configured to grab the workpiece at a predetermined location for lifting the workpiece to a next assembly line station.

10. The automatic degate machine of claim 9, wherein said gripping device and said punch assembly are both positioned at an end-of arm location on said robotic arm.

11. The automatic degate machine of claim 1, wherein the workpiece is a raw casting and wherein said gripping device and said punch assembly are aligned such that each of said respective pucks is configured to engage a respective biscuit of excess metal and punch it away from the workpiece before the gripping device is in alignment with a gripping site on the workpiece.

12. An automatic degating system comprising:
    a fixture configured to receive a raw casting from an upstream assembly line station, the raw casting including a plurality of biscuits of excess material and a plurality of cylinder bores;
    a robotic arm comprising:
        a punch assembly comprising:
            a support bracket;
            a plurality of elongate rods extending orthogonally from said support bracket, each of said plurality of elongate rods having a predetermined length; and
            a respective cutting puck coupled to a distal end of each of said plurality of elongate rods, each said respective cutting puck sized and shaped to be inserted into a respective cylinder bore of the plurality of cylinder bores and configured to remove the plurality of biscuits of excess material from the raw casting; and
        a gripping device configured to engage lifting features on the raw casting after the plurality of biscuits of excess material have been removed.

13. The automatic degating system of claim 12, wherein at least one respective puck includes an irregular circular cross-section including a plurality of arc segments and a plurality of straight segments, and at least one respective puck includes a beveled edge.

14. The automatic degating system of claim 12, wherein a length of the plurality of elongate rods is selected to ensure said cutting pucks engage respective ones of the plurality of biscuits of excess material before said gripping device is aligned with a lifting feature on the raw casting.

15. The automatic degating system of claim 12, wherein a length of the plurality of elongate rods is selected to ensure at least some of said cutting pucks engage respective ones of the plurality of biscuits of excess material sequentially.

* * * * *